3,034,924
USE OF A RARE EARTH METAL IN VAPORIZING METALS AND METAL OXIDES
Thaddäus Kraus and Peter Rheinberger, Vaduz, Liechtenstein, assignors to Balzers Patent- und Lizenz-Anstalt, Balzers, Liechtenstein
Filed Dec. 26, 1958, Ser. No. 783,042
Claims priority, application Switzerland Oct. 30, 1958
13 Claims. (Cl. 117—106)

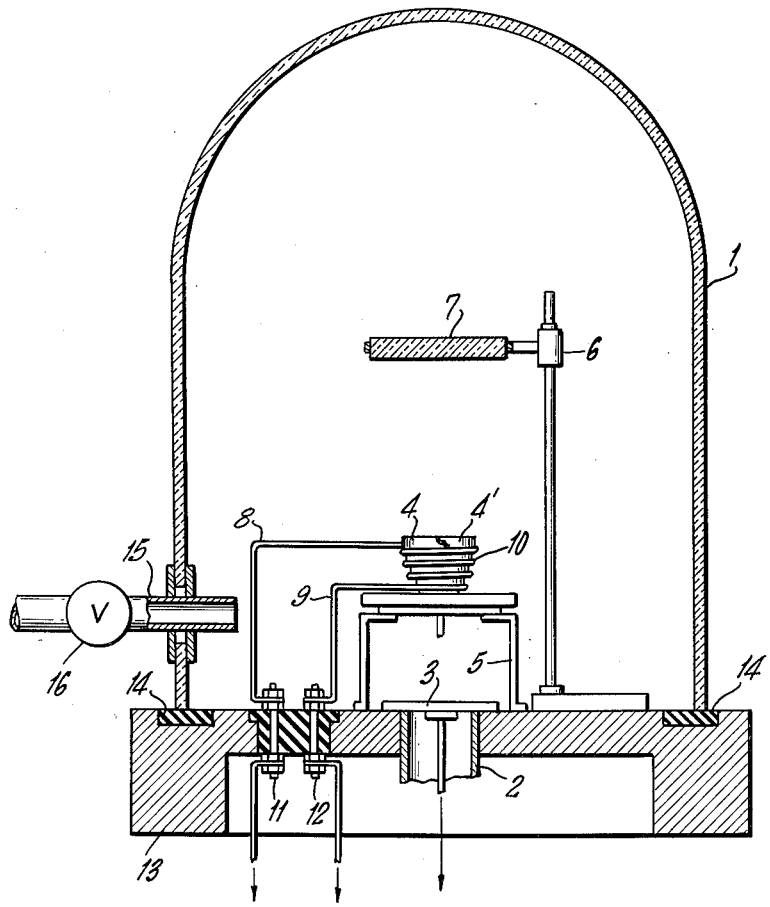

This invention relates to the production of relatively thin strata or protective coats for optical and other purposes.

Thin oxide layers are used in the industry to a great extent as protective coats, in particular for optical purposes. As protective coats they have the function of protecting sensitive surfaces of objects, for example, precision parts of precision mechanics, lenses, surface mirrors, etc. against corrosion and mechanical damage. In the optical industry oxide layers are used as high- and low-refracting films for reflection-reducing coats, also for interference filters, beam splitters, heat filters, lime light reflectors, coats for eye glasses and the like.

The mechanical and optical properties of these oxide layers depend not only on the type of the oxide applied, but also on the method by which the oxide is applied.

Conventionally oxide layers are produced by direct evaporation of oxidic starting materials in the vacuum and condensation of the vapors on the bases to be coated. This method has inherent disadvantages for many optical purposes since most oxides yield in the evaporation and condensation in the vacuum absorbent layers, even if oxides are used as starting materials which are in themselves absorption-free. This is probably due to the fact that the vacuum has a reducing effect on most oxides at high temperatures and because generally unsaturated oxides show mostly optical absorption. There are only a few exceptions to this rule: for example, niobium oxide and cerium oxide can be evaporated, and absorption-free layers are obtained.

In order to eliminate these difficulties in the production of absorption-free oxide layers, other methods have been developed. It is known to produce metal oxide layers by evaporating metallic layers and subsequently oxidizing them, or by cathodic atomization of the respective metals in oxygen (see also the publication by K. Hammer: "Increase of Glass Reflection by Metal Oxide Layers" in Optik, vol. 3, No. 5/6, 1948, p. 495).

Another known method is the evaporation of the starting substances in oxidizing atmosphere.

For the industrial production of oxide layers the conventional methods are disadvantageous since they are time consuming so that multi-layer systems, for example, interference heat filters and lime light reflectors, which frequently consist of 20 to 30 individual layers, are rather expensive to produce.

In the case of the known oxidation of metal layers the individual layers must be oxidized separately (or at best a few layers at a time), because the oxygen does not diffuse sufficiently through thicker layer packs. Besides, the layers change their thickness in the oxidation. The maintenance of exact layer thickness relations, which is indispensable for the interference systems, is thus very difficult. Another disadvantage of this known method is that many objects on which the thin layers are to be applied, for example, cemented lens systems, must not be heated to the high temperature required for the oxidation.

The other known method, cathodic atomization in oxygen, is in itself very time-consuming and leads to a frequently inadmissible temperatue increase in the bases to be coated. Besides, the layers produced by cathodic atomization have frequently more stray light than those produced by evaporation on the same materials, and for this reason they are not universally applicable.

According to the best methods available so far about 6 to 8 hours were required in the vacuum-evaporation process for the production of a lime light reflector composed of 25 individual layers consisting of alternating high- and low-refracting layers of $SiO_2$ and $TiO_2$, as it is used for example, for movie projectors, if the layers are to be hard, adhesive and absorption-free.

An object of the present invention is therefore to provide a new method for the production of thin oxide layers on bases by the evaporation of oxidic and/or oxidizable starting materials in the vacuum, which overcomes the above mentioned difficulties and which is characterized in that one or several elements from the group of the rare earths (including yttrium, lanthanum, and cerium) and/or one or more compounds of the above mentioned elements are added to the starting substance to be evaporated and that this mixture is evaporated in the vacuum and the vapor condensed on the bases.

A further object of the invention is to provide means facilitating the production of thin oxide layers on bases by evaporation within a single chamber.

An additional object of the invention is to provide a new method of coating a base with multiple layers of different materials including metals and rare earth metals so that the layers are substantially absorption-free yet may be applied economically.

Still another object of the invention resides in the provision of a novel apparatus for coating various types of bodies, especially for optical use with alternating layers of substantially absorption-free metal oxides.

According to the method of the invention it is possible to produce hard and adhesive oxide layers with the lowest possible absorption of the respective layer substances and in a much shorter time than with the known methods, because the process according to the invention either requires no inherent after-oxidation in the oxidizing atmosphere or, if this should be necessary, it takes place within a short time (frequently spontaneously) in contrast to the known layer tempering methods. Nevertheless, the evaporation can be effected at the conventional evaporation rate.

The process according to the invention makes it now possible to evaporate not only a few oxides which up to now were the exception to the general rule, such as niobium oxide or pure cerium oxide, with low or no absorption, but also other known oxides whose evaporation in the vacuum is not possible without reduction.

According to other features of the invention more than 5 mol. percent of the above mentioned elements and their compounds are preferably added to the starting substance, the admixture of cerium and/or compounds of cerium and praseodymium and/or its compounds having proved particularly effective.

The layers produced according to the invention contain not only the oxides already contained in the starting substances, like titanium oxide, silicon oxide, etc. but also oxides of the added elements or compounds from the group of rare earths (including yttrium, lanthanum and cerium), which show no interfering absorption in the visible.

The effect of the invention, however, must not be understood in this way that, because an absorption-free evaporable oxide, for example, cerium oxide, is added to the starting substance, the total absorption is lower corresponding to the dilution by the added absorption-free component.

The addition has rather the effect that components of the starting substances which could not be evaporated until now without interfering absorption, yield a condensate of much lower absorption than up to now, that is, their reduction is apparently avoided or perhaps a desired oxidation is achieved during the evaporation.

The invention is described more fully on the basis of the following examples. In the visible spectral range are obtained practically completely absorption-free hard and adhesive layers with a high index of refraction on glass bases, since a mixture of titanium oxide (no matter whether TiO or $TiO_2$) and cerium oxide (no matter whether $CeO_2$ or $Ce_2O_3$) in a molecular ratio of 1:1 to 8:1 is evaporated in the vacuum ($10^{-5}$ atm.) and deposited on the bases. This mixture evaporates in the tungsten crucible at temperatures of about 1700–1100° C. without any difficulties. It is surprising that oxide layers are obtained which are absorption-free in the visible (that is saturated with a maximum amount of oxygen according to the prevailing opinion), while the same starting substances, but without the admixture of cerium oxide or one or more of the above mentioned elements and their compounds yield absorbent layers under otherwise equal production conditions, which is attributed to a content of TiO.

But the TiO content was also obtained when the starting substances contained only pure $TiO_2$. On the other hand, it is surprising that the process according to the invention can be used with equally good results in the evaporation of $TiO_2$, TiO and with a short after-oxidation even of metallic titanium, and that it is effective no matter whether cerium and the other above mentioned elements are added to the starting substance in metal form or in the form of compounds.

Other examples for which the process according to the invention is recommended, are compiled in the following table. The indicated numerical values represent guiding directions. Anybody skilled in the art can easily decide from which of these values he can deviate in adaptation to special conditions. Variable, for example, as anybody skilled in the art knows, is the evaporation temperature, depending on the desired evaporation rate, the latter being again dependent on the desired index of refraction of the layer. Rapid evaporation yields as a rule higher refracting layers than slow evaporation. Variable is naturally also the evaporation time, not only in view of the evaporation rate to be maintained, but naturally also with regard to the layer thickness to be obtained.

The mixing ratios may also be variable because there are no sharp limits at which the desired effects according to the invention would suddenly set in. There are rather all possible transitions from the layers obtained from the starting substances alone without any addition of elements or compounds from the group of the rare earths, to the layers where the added component predominates by far, that is, practically layers, obtained from the oxides of the rare earths used. Correspondingly, the properties of the layers obtained will also vary, but the basic finding of the invention, as already mentioned, consists in that the optical absorption of the layers obtained from the evaporation and condensation of the indicated mixtures is much lower than would have to be expected from the mixing ratios alone. This is expressed in the fact that an admixture of more than 5 mol. percent yields in many of the above mentioned examples practically completely absorption-free layers, while with a mere dilution of the layers obtainable from the starting substances along with an absorption-free oxide of the rare earths, with a dilution of 50%, half of the original absorption, which is usually in the order of a few up to 30% of the incident light with lambda/4 layers, would still be left.

The rule seems to apply that the process according to the invention is particularly suitable for the production of layers of those oxides whose heat of formation (related to one oxygen atom in the molecule) is lower than the heat of formation of cerium oxide ($CeO_2$).

The table contains: under (a) under No. 1–8 elements and compounds from the group of the rare earths (including yttrium, lanthanum and cerium) which can be added to the starting substances. Frequently it is convenient not to use pure elements or compounds from the above mentioned group for the admixture to the starting substances, because they are difficult to obtain. It is rather possible to use commercial rare earth mixtures (including the yttrium earths), whose usual percentual composition is given below. These percentages, given under (a), must not be confused with the molar percentages about the admixture of rare earths to the starting substances.

The table also contains under (b) examples:
In line 1: suitable starting substances;
In line 2: commercial rare earths mixtures which can be used and have been tried out for the admixture, the numbers 1–8 meaning that each of the mixtures can be used;
In line 3: suitable evaporation temperatures for the above mentioned substances;
In line 4: suitable materials for the evaporating dish. In the columns 1 and 2 a distinction has to be made whether oxides or metals are to be used as starting substances according to line 1. Those skilled in the art know that some of the above mentioned substances can be transformed just as well by thermal evaporation into vapor form by means of cathodic atomization, a method which is equivalent in many respects to the vacuum evaporation method, and condensed subsequently on the bases.

Under (c) of the table are indicated three different variants (alpha, beta, gamma), of the evaporation in the production of layers according to the invention. The well known experience is verified here that the evaporation at room temperature of the base and in the ordinary vacuum (variant beta), can be replaced by the evaporation in a higher vacuum and higher temperature of the base (variant alpha); likewise, a shorter evaporation time (variant gamma), requires a heat treatment.

Section (d) of the following table contains finally examples for a modified procedure of the method, according to which the admixture of the elements or compounds of the rare earths to the starting substances is not effected in the same evaporating crucible, but that one or more of the elements from the group of the rare earths (including yttrium, lanthanum and cerium) and/or one or more compounds of these elements are added to the layers obtained by the condensation of a starting substance on a base by applying one or more of the above mentioned elements and compounds in a thin layer on the base in direct contact with the layer obtained from the starting materials, and that subsequently the various layer substances are mixed by diffusion, preferably by heat treatment.

Listed in section (d) are metals which are suitable as starting substances and the temperatures at which they can be evaporated from carbon dish; also listed are metals and compounds suitable for the evaporation from molybdenum dish.

The process according to section (d) can also be carried out in this way that the starting substances and the elements or compounds from the group of the rare earths to be added are evaporated simultaneously from separate evaporating crucibles and deposited on the condensation surfaces.

(a) 1. Cerium-misch metal: approx. 50% Ce, 20% Nd, 5% Pr, 25% La plus other rare earths.
2. Cerium oxide: 99.9% $CeO_2$.
3. Cerite oxide: approx. 50% $CeO_2$, 20% $La_2O_3$, 5% $Pr_2O_3$, 20% $Nd_2O_3$, 5% other oxides.
4. 99.4% $La_2O_3$.
5. Neodymium oxide: approx. 90% $Nd_2O_3$, 8% $Pr_6O_{11}$, 2% $Sm_2O_3$.
6. Praseodymium oxide: approx. 97% $Pr_6O_{11}$, 0.2% $Nd_2O_3$, 0.25% $CeO_2$, balance $La_2O_3$.
7. Samarium oxide: approx. 95% $Sm_2O_3$, 2% $Pr_2O_3$, 1% $Nd_2O_3$.
8. Didymium oxide: approx. 40% $Nd_2O_3$, 10% $Pr_2O_3$, 13% $La_2O_3$, balance other oxides.

| (b) Starting substance | Si or SiO or Si+ $SiO_2$ or $SiO_2$ | Ti or TiO or Ti+$TiO_2$ | Sn or $SnO_2$ | Cu |
|---|---|---|---|---|
| additive | 1–8. | 1–8. | 1–8. | 1. |
| evaporation temperature | approx. 1,450° C. | 1,700° C. | 1,350° C. | 1,500° C. |
| boat (dish) material | {for metal: C. <br> {for oxide: Mo. | for metal: C. <br> for oxide: W. | }Mo | Mo |

| Starting substance | Cr or Cr+ $Cr_2O_3$ or $Cr_2O_3$ | Mn | Fe or FeO | Ni | Co |
|---|---|---|---|---|---|
| additive | 1–8. | 1. | 2–8. | 2–8. | 2–8. |
| evaporation temperature | 1,300° C. | 1,050° C. | 1,500° C. | 1,600° C. | 1,800° C. |
| boat material | W. | Mo. | W. | W. | W. |

| (c) variant | α | β | γ |
|---|---|---|---|
| evaporation time per lambda/4 layer | 2 min. | 2 min. | less than 1 min. |
| temp. of base | 300° C. | 30° C. | less than 200° C. |
| pressure ($O_2$+$H_2O$) | $1.10^{-5}$ mm. Hg. | $1.10^{-4}$ mm. Hg. | less than $5.10^{-4}$. |
| after treatment | none. | none. | tempering 300° C. air. |

(d) Separate evaporation of the starting substance and the elements or compounds from the group of the rare earths to be added (including yttrium, lanthanum and cerium).
From C-dish: Zr (2100° C.), Th (2400° C.), V (2050° C.).
From Mo dish: Pb (800° C.), In (600° C.), Tl (650° C), ZnO (900° C.), CdO (900° C.), Bi (800° C.), $MoO_3$ (700° C.), $WO_3$ (700° C.).
Cerite and yttrium earths (1400° C.) from W-dish.
Mixing portion of cerite- and yttrium earths: 5–50 mol. percent.

The process can be carried out by means of a device according to the attached drawing. 1 denotes the receptacle which can be evacuated over a line 2 with a valve 3 by means of a vacuum pump to a pressure of about $10^{-4}$ mm. Hg or better. 4 denotes the evaporating crucible (frequently also called evaporating dish), in which the material to be evaporated is molten. This crucible consists of one of the materials listed in the table for the evaporating dish. 5 is the holding device for the crucible, 6 the holding device for the glass plate or lens 7 to be treated with vapor. 8 and 9 are the current supplies for the electrical filament winding 10 which surrounds the crucible 4. 11 and 12 are the vacuum-tight electrical ducts.

The whole arrangement is assembled on a base plate 13. The vacuum-tight seal between the bell of the receptacle and the base plate is effected by the packing 14.

For some examples it is necessary to introduce oxygen or steam or atmospheric air into the receptacle. To this end is provided the gas supply line 15, which can be shut off by means of a valve 16.

For carrying out the process of the invention according to section (d) of the table there are required two separate crucibles in the evaporating plant. The second crucible 4' behind crucible 4 can be provided in the chamber in the same manner as the crucible 4 and provided with its own current supply.

The realization of the process according to section (d) of the table is described here on the basis of a special example:

In the above described vacuum-evaporating plant, thorium is evaporated from a first carbon dish 4 at a temperature of about 2100° and the vapors formed are deposited on lens 7. (Since the crucible consists of carbon, it can be heated by direct current, without the use of an electric filament or winding.) At the same time an element or a compound from the group of the rare earth metals, for example, the cerium misch metal listed under (a), 1 of the table, is evaporated from a second crucible 4', which is arranged in the same chamber and which consists of tungsten, the vapors being deposited together with the thorium vapors on the lens. A composite layer is thus formed which passes, however, immediately into a completely absorption-free oxide layer under the influence of the elements from the group of the rare earth metals in the presence of oxidizing gases, this layer consisting partly of thorium oxide and partly of the oxides of the rare earth metals used.

The oxidizing gas, for example, steam, is introduced over the line 15 by means of the valve 16, up to a pressure of about $2.10^{-4}$ mm. Hg in the receptacle or chamber. The amount of the materials in the two evaporating dishes is so proportioned that the portion of the vapors from the compounds of the rare earth metals in the vapor space is 5 to 50 mol. percent.

In a slightly modified realization of the same process layers of thorium and cerium misch metal are applied alternately on the base, and the layers mixed subsequently to thermal diffusion, so that finally a homogeneous mixed layer is formed, which oxidizes just as rapidly and easily as if the evaporation of the mixture were effected from a common crucible.

What has been demonstrated here on the basis of the example of thorium and cerium misch metal can also be applied in a similar manner to the other examples under (d) of the table.

It has not been clarified yet on what the effect of the process according to the invention is based, whether perhaps on a catalytic effect of the metal added in pure form or in the form of a compound from the group of the rare earth metals (including yttrium, lanthanum and cerium) or on the formation of special compounds or intermediate products in the evaporating material and the resulting layer.

For the technical application it is important, however, that the time required according to this process for the evaporation of oxidation layers, which are known in themselves, can be considerably reduced, if it is important to obtain oxide layers with a low absorption.

It has frequently proved practical to produce the mixtures to be evaporated in a preceding distillation process by distilling a mixture, for example, of TiO and cerium oxide, or cerium itself, in the vacuum on a condensation surface and using the distillate, which is obtained in powder form and which represents a finely disperse mixture or possibly a compound, for the subsequent evaporation of thin layers.

In carrying out the invention it has to be noted that some of the mixtures destined according to the invention for evaporation are pyrophoric and must therefore be handled with care and only in small quantities. This was observed, for example, in a mixture of SiO and cerium oxide, which was used for the preparation of absorption-free silicon layers (SiO alone yields highly absorbent layers in layer thicknesses as they are used for the interference systems).

Occasionally it may be of advantage to effect the evaporation of the mixture with simultaneous heating of the base. In itself the evaporation of thin layers with simultaneous heating of the base is already known.

During the process the condensate oxidizes, as already mentioned, the necessary oxygen being frequently available in sufficient quantities from the residual gas atmosphere, even in an evaporating plant, which had been evacuated to the usual evaporation pressure ($10^{-4}$ atm. or better). Perhaps the necessary oxygen originates from the steam desorbed from the walls of the evaporating plant.

An artificial enrichment of the residual gas atmosphere with oxygen is frequently advisable, as it was found, in which case the vacuum and the evaporating rate can be kept higher than in the known processes of this kind. In spite of this fact hard and adhesive layers with the lowest possible absorption can be easily obtained.

In some cases the complete oxidation of the layers takes place only after the evaporation on the base, as soon as an oxidizing gas mixture (air), is introduced into the evaporating plant.

This subsequent oxidation, subsequent oxidation of layers is known in itself, takes place when the application of the layers is effected according to the process of the invention at a very high velocity so that a layer, which is after the application for example, non-transparent with a metallic shine, turns immediately into a transparent, absorption-free oxide layer as soon as the plant is flooded with atmospheric air and possible under the additional effect of a moderate temperature increase by the preceding evaporation. Layer substances which can otherwise only be oxidized by the application of high temperatures and long tempering periods, oxidize easily and rapidly when an element of the rare earths or their compounds is added to the evaporating materials.

Thus it can be seen that there has been defined a novel process for the production of thin oxide layers on bases by evaporation in a vacuum, a starting substance which may be selected from various metals such as thorium, silicon, titanium, copper, tin, chromium, magnesium, iron, nickel and cobalt and of oxides thereof while simultaneously heating a rare earth metal in the same chamber and in the presence of the starting substance, both heating steps being carried out at a temperature ranging between 1050° C. and 1800° C., and then introducing an oxidizing gas at very low pressure into the vacuum to coat the base with composite non-absorbent layers.

Further, there has been set forth a novel apparatus for coating a body comprising a vacuum tight chamber having a pair of crucibles therein to which electrical conduits are attached for heating the crucibles. Further, there has been described that a stand is provided in the chamber with a clamp thereon for adjustably holding a body to be coated in adjusted position above the crucibles. The chamber is provided with a conduit for introducing oxygen rich gas into the chamber. Further, one of the crucibles is constructed of carbon and the other crucible is constructed of tungsten.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. The method of coating a surface of a body with a layer of an oxide of a metal comprising the steps of heating a substance selected from the group consisting of a metal and a metal oxide to a temperature sufficient to at least partially evaporate said substance, simultaneously and separately heating a rare earth metal containing substance to a temperature sufficient to evaporate at least partially said rare earth metal containing substance, and condensing the vapors of said substance and said rare earth metal containing substance on said body to form a layer thereon, which is practically nonabsorbing of visible light.

2. The process according to claim 1 wherein the evaporation is performed in an oxidizing atmosphere.

3. The process according to claim 1 wherein an oxidizing gas is introduced into the evaporation chamber after the deposition of said coating on said body.

4. A process for the production of thin oxide layers on a body comprising the steps of placing the body to be coated in a chamber, evacuating said chamber, heating in said vacuum in said chamber a first crucible containing a starting substance selected from the group consisting of thorium, titanium, copper, tin, chromium, magnesium, iron, nickel, and cobalt, and the oxides thereof, simultaneously heating in a second crucible in said chamber a rare earth metal containing substance in the presence of said starting substance, both heating steps being at a temperature ranging between 1050° C. and 1800° C., and then introducing an oxidizing gas at very low pressure into said vacuum to coat said body with composite nonabsorbent layers, the proportion of vapors of said starting substance to the vapors of rare earth metals in said chamber being from 5 to 50 mol. percent.

5. Process according to claim 4, characterized in that praseodymium is added to the starting substance.

6. The process according to claim 4, wherein the rare earth metal is cerium.

7. A method of coating the surface of a body with an oxide layer which is substantially nonabsorbent of visible light, which comprises heating in vacuo a substance selected from the group consisting of metals and their oxides and a rare earth metal containing material to a temperature sufficient to at least partially vaporize said substance and said rare earth metal containing material, and condensing and depositing the vapors of said substance and said rare earth metal containing material thus formed on the surface of said body, the mole percentage ratio of rare earth metal containing material to said substance being at least 1:20.

8. A method as claimed in claim 7, wherein said metal is selected from the group consisting of thorium, titanium, copper, tin, chromium, magnesium, iron, nickel and cobalt.

9. A method as claimed in claim 7, wherein said substance and said rare earth metal containing material are intimately mixed prior to said heating in vacuo.

10. A method as claimed in claim 7, wherein said oxides are lower oxides.

11. A method as claimed in claim 7, wherein said substance and said rare earth metal containing material are heated at different locations but within the same general evacuated space so that the vapors of said substance comingle with the vapors of said rare earth metal containing material and condense and deposit on said surface in the form of a composite layer.

12. A method as claimed in claim 7, wherein said heating under vacuo is performed in an oxidizing atmosphere.

13. A method as claimed in claim 7, wherein an oxidizing gas is passed over said substance and said material during heating in vacuo.

(References on following page)

References Cited in the file of this patent

UNITED STATES PATENTS

| | | |
|---|---|---|
| 2,539,149 | Miller | Jan. 23, 1951 |
| 2,784,115 | Brinsmaid et al. | Mar. 5, 1957 |

FOREIGN PATENTS

| | | |
|---|---|---|
| 632,442 | Great Britain | Nov. 28, 1949 |
| 697,403 | Great Britain | Sept. 23, 1953 |
| 307,775 | Switzerland | Aug. 16, 1955 |
| 322,265 | Switzerland | July 31, 1957 |